United States Patent
Vasseur et al.

(10) Patent No.: US 9,294,488 B2
(45) Date of Patent: Mar. 22, 2016

(54) CONTROL LOOP CONTROL USING BROADCAST CHANNEL TO COMMUNICATE WITH A NODE UNDER ATTACK

(71) Applicant: Cisco Technology, Inc., San Jose, CA (US)

(72) Inventors: Jean-Philippe Vasseur, Saint Martin d'Uriage (FR); Javier Cruz Mota, Assens (CH); Andrea Di Pietro, Lausanne (CH); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 27 days.

(21) Appl. No.: 14/165,415

(22) Filed: Jan. 27, 2014

(65) Prior Publication Data

US 2015/0188934 A1    Jul. 2, 2015

Related U.S. Application Data

(60) Provisional application No. 61/922,568, filed on Dec. 31, 2013.

(51) Int. Cl.
*H04L 29/06* (2006.01)
*G06N 99/00* (2010.01)
*H04W 12/12* (2009.01)

(52) U.S. Cl.
CPC .......... *H04L 63/1416* (2013.01); *G06N 99/005* (2013.01); *H04L 63/1441* (2013.01); *H04L 63/1458* (2013.01); *H04W 12/12* (2013.01)

(58) Field of Classification Search
CPC . H04L 63/1416; H04L 63/1441; H04L 63/20; H04L 63/10; H04L 45/16; G06N 99/005
See application file for complete search history.

(56) References Cited

U.S. PATENT DOCUMENTS

| | | | |
|---|---|---|---|
| 7,137,145 B2 | 11/2006 | Gleichauf | |
| 7,483,972 B2 | 1/2009 | Bhattacharya et al. | |
| 7,526,806 B2 | 4/2009 | Wiley et al. | |
| 7,607,041 B2 | 10/2009 | Kraemer et al. | |
| 7,653,941 B2 | 1/2010 | Gleichauf | |
| 7,779,471 B2 | 8/2010 | Balasubramaniyan et al. | |
| 8,230,498 B2 | 7/2012 | Shaffer et al. | |

(Continued)

OTHER PUBLICATIONS

Vasseur, et al., "Computer Network Attack Mitigation", U.S. Appl. No. 61/922,568, filed Dec. 31, 2013, 58 pages, Alexandria, VA.

(Continued)

*Primary Examiner* — Izunna Okeke
(74) *Attorney, Agent, or Firm* — Parker Ibrahim & Berg LLC; James M. Behmke; Stephen D. LeBarron

(57) ABSTRACT

In one embodiment, a control loop control using a broadcast channel may be used to communicate with a node under attack. A management device may receive data indicating that one or more nodes in a computer network are under attack. The management device may then determine that one or more intermediate nodes are in proximity to the one or more nodes under attack, and communicate an attack-mitigation packet to the one or more nodes under attack by using the one or more intermediate nodes to relay the attack-mitigation packet to the one or more nodes under attack.

11 Claims, 7 Drawing Sheets

(56) References Cited

U.S. PATENT DOCUMENTS

| | | |
|---|---|---|
| 8,261,355 B2 | 9/2012 | Rayes et al. |
| 8,488,488 B1 | 7/2013 | Hermanns et al. |
| 2012/0144038 A1 | 6/2012 | Hildebrand |
| 2012/0210422 A1 | 8/2012 | Friedrichs et al. |
| 2012/0307624 A1* | 12/2012 | Vasseur et al. ........ 370/221 |
| 2013/0022084 A1 | 1/2013 | Vasseur et al. |
| 2013/0139261 A1 | 5/2013 | Friedrichs et al. |
| 2013/0269032 A1 | 10/2013 | Chasko et al. |
| 2013/0305362 A1 | 11/2013 | Hermanns et al. |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

Wood, et al., "JAM: A Jammed-Area Mapping Service for Sensor Networks", 24th IEEE Real-Time Systems Symposium (RTSS 2003), Dec. 2003, pp. 286-297, Institute of Electrical and Electronics Engineers.

Wood, et al., "DEEJAM: Defeating Energy-Efficient Jamming in IEEE 802.15.4-Based Wireless Networks", 4th Annual IEEE Communications Society Conference on Sensor, Mesh and Ad Hoc Communications and Networks (SECON '07), Jun. 2007, pp. 60-69, Institute of Electrical and Electronics Engineers.

Xu, et al., "Jamming Sensor Networks: Attack and Defense Strategies", IEEE Network, vol. 20, Issue 3, May-Jun. 2006, pp. 41-47, Institute of Electrical and Electronics Engineers.

International Search Report issued Apr. 14, 2015 in connection with PCT/US2014/072738.

Heiner Perry: "On Secure Routing in Low-Power and Lossy Networks: The Case of RPL. Master-Thesis", Aug. 20, 2013, retrieved from the Internet: URL:http://inet.cpt.haw-hamburg.de/thesis/completed/Heiner_Perry-Ma.pdf, p. 56, line 17-p. 58, line 9; figure 4.3.

Shahid Raza et al.: "SVELTE: Real-time intrusion detection in the Internet of Things", AD Hoc Networks, vol. 11, No. 8, Nov. 1, 2013, pp. 2661-2674.

Anhtuan Le et al.: "6LoWPAN: a study on QoS security threats and countermeasures using intrusion detection system approach", International Journal of Communication Systems, vol. 25, No. 9, Sep. 23, 2012, pp. 1189-1212.

T. Tsao, R. Alexander, Cooper Power Systems, M. Dohler, CTTC, V. Daza, A. Lozano, Universitat Pompeu Fabra, M. Richardson, Sandelman Software Works: "A Security Threat Analysis for Routing Protocol for Low-power and lossy networks (RPL); draft-ietf-roll-security-threats-06.txt" Internet Engineering Task Force, IETF; Standard Working Draft; Internet Society (ISOC) 4, Rue des Falaises CH—1205 Geneva, Dec. 16, 2013, pp. 1-40.

* cited by examiner

CONTROL LOOP CONTROL USING BROADCAST CHANNEL TO COMMUNICATE WITH A NODE UNDER ATTACK

RELATED APPLICATIONS

This application claims priority to U.S. Provisional Application No. 61/922,568, filed Dec. 31, 2013, entitled: COMPUTER NETWORK ATTACK MITIGATION, by Vasseur et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely on one or more ML algorithms for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
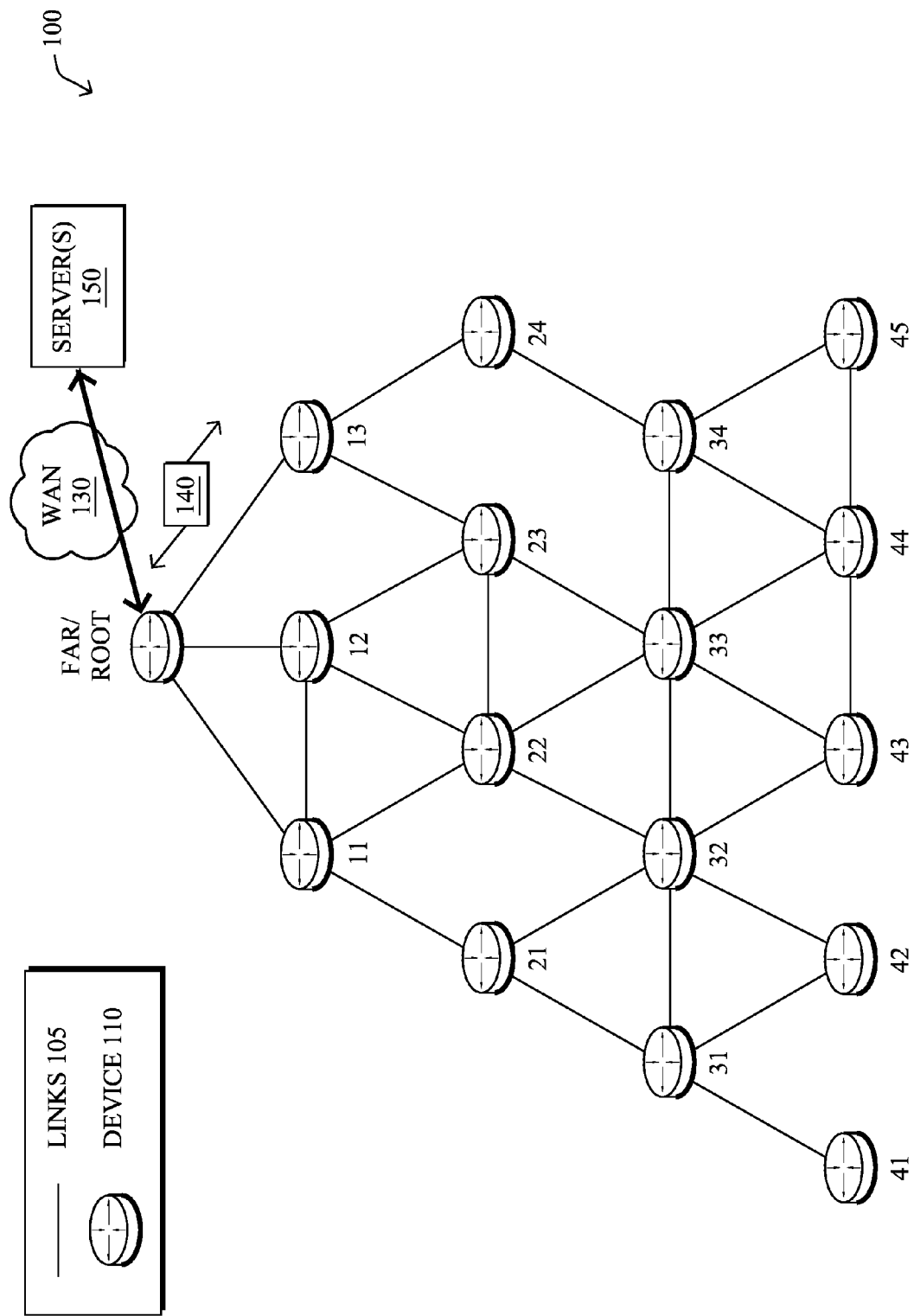
FIG. 1 illustrates an example communication network.

According to one or more embodiments of the disclosure, a control loop control using a broadcast channel may be used to communicate with a node under attack. A management device hosting a learning machine engine may receive data indicating that one or more nodes in a computer network are under attack (e.g. Denial of Service attacks). The management device may then determine that one or more intermediate nodes are in proximity to the one or more nodes under attack, and communicate an attack-mitigation packet to the one or more nodes under attack by using the one or more intermediate nodes to relay the attack-mitigation packet to the one or more nodes under attack.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
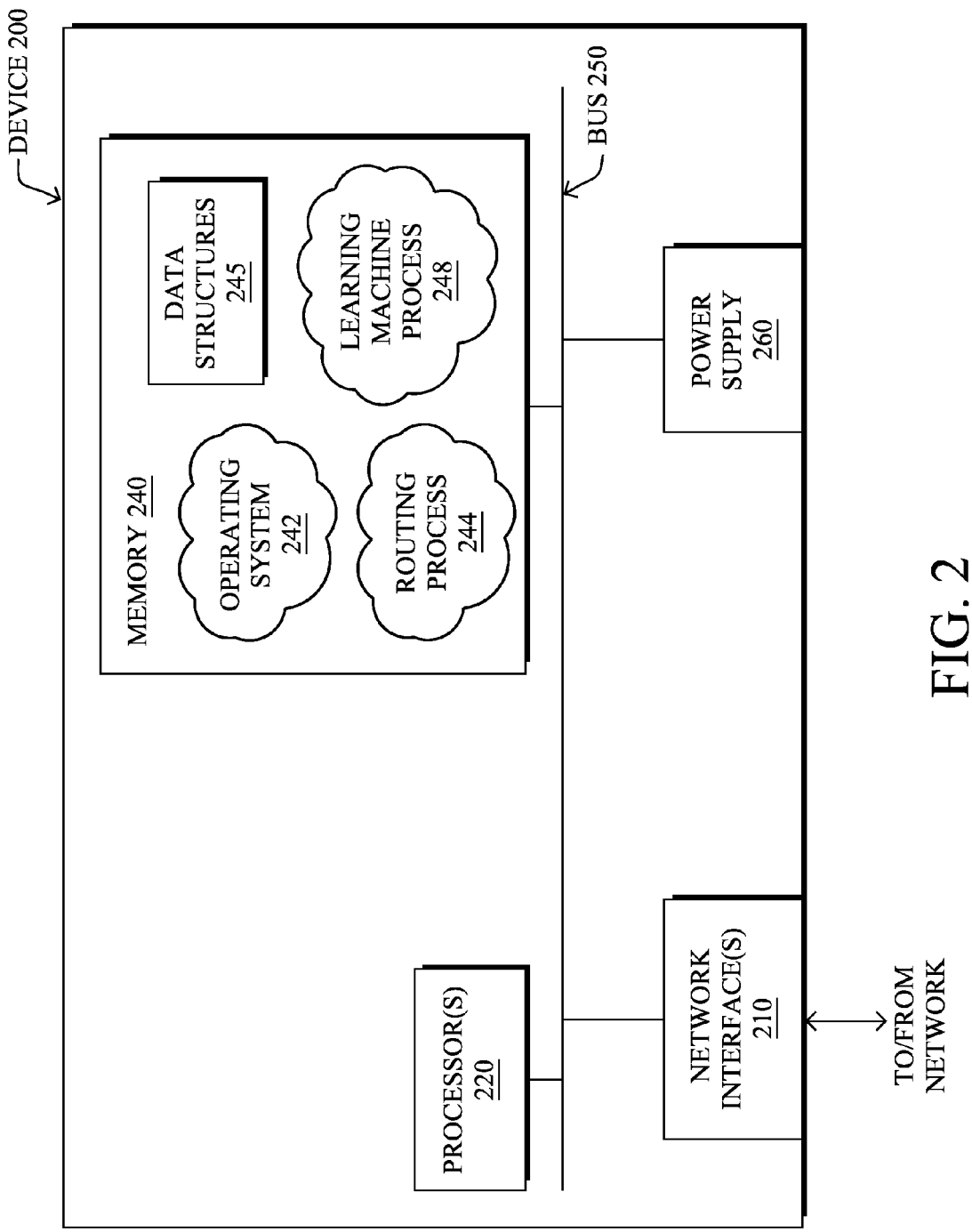
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
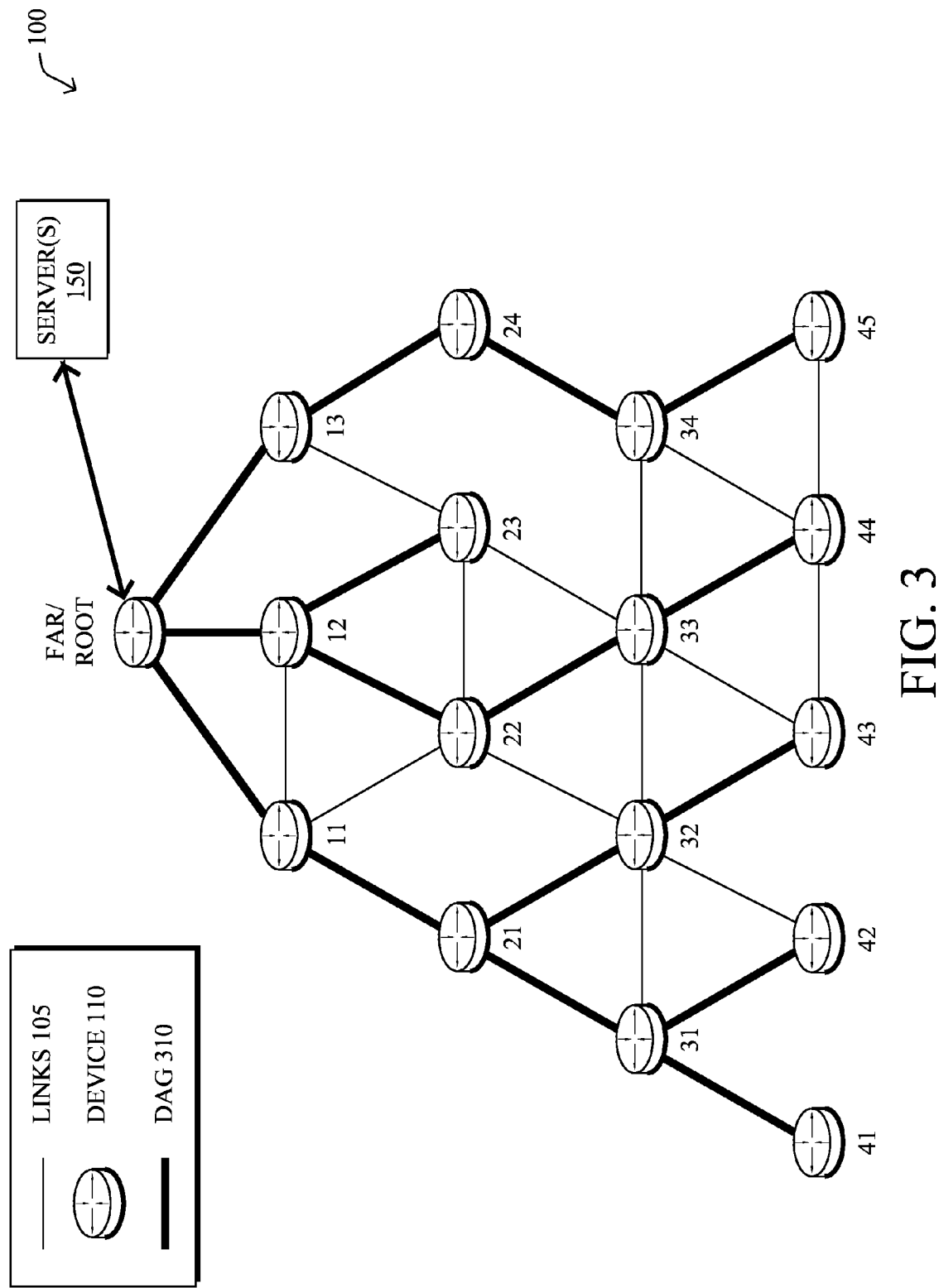
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Artificial Neural Networks (ANNs) are mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by, ANNs are able to perform highly non-linear operations to input data.

The interesting aspect of ANNs, though, is not that they can produce highly non-linear outputs of the input, the interesting aspect is that they can learn to reproduce a predefined behavior through a training process. This capacity of learning has allow the successful application of ANNs to a wide variety of learning problems, such as medical diagnosis, character recognition, data compression, object tracking, autonomous driving of vehicles, biometrics, etc.

Learning in ANNs is treated as an optimization problem where the weights of the links are optimized for minimizing a predefined cost function. This optimization problem is computationally very expensive, due to the high number of parameters to be optimized, but thanks to the backpropagation algorithm, the optimization problem can be performed very efficiently. Indeed, the backpropagation algorithm computes the gradient of the cost function with respect to the weights of the links in only one forward and backward pass throw the ANN. With this gradient, the weights of the ANN that minimize the cost function can be computed.

Denial of service (DoS) is a broad term for any kind of attack aiming, by any means, at making a particular service unavailable (be it a certain application running on a server or network connectivity itself). This is usually performed by bringing the target's resources to exhaustion (again, target resources may range from bandwidth to memory and CPU).

In greater detail, a denial-of-service attack may consist in flooding a target network with hundreds of megabits of traffic (volume based DoS), exhausting a server state by opening a number of TCP connections (SYN flooding) or by making an HTTP server unavailable by sending it an overwhelming number of requests. An attack may be subtler and exploit well-known vulnerabilities in the target system (e.g. a large number of fragmented IP packets may exhaust the resources of a router).

Nowadays, denials of service attacks are mostly distributed: they are indeed carried out by multiple sources at the same time, thus making it more difficult to track. In many cases botnets (i.e. armies or infected hosts spread across the network and under the control of a single master) are used for mounting DoS attacks. In addition, source addresses used for attacks can be spoofed, so that blocking an offending address is potentially useless.

A large literature exists about detection and mitigation of DoS attacks. Such attacks are easy to detect when they are brute-force, but, especially when highly distributed, they may be difficult to distinguish from a flash-crowd (i.e. an overload of the system due to many legitimate users accessing it at the same time).

Statistics and machine learning techniques have been proposed for detecting attacks at the server or network level. Some approaches try to analyze changes in the overall statistical behavior of the network traffic (e.g. the traffic distribution among flow flattens when a DDoS attack based on a number of microflows happens). Other approaches aim at statistically characterizing the normal behaviors of network flows or TCP connections, in order to detect significant deviations.

However, the Internet of Things represents a completely different scenar and requires novel detection and reaction strategies. Its highly distributed nature implies that there is no central vantage point where an attack can be observed. In addition, its very scarce resources force reporting from the nodes to a central location to be reduced to a minimum.

On top of the lack of global information, detecting DoS in the IoT in made harder by the fact that a much subtler interference may be enough for bringing the network down.

For example, a jamming node can prevent a node from decoding traffic by just emitting short bursts when activity on the channel is detected. This can isolate a large portion of the network which uses that node as a parent and cut off a large portion of the network.

In addition, in case of battery operated nodes, a slow but steady flow of malicious traffic can exhaust a node's battery, thus making it useless in a matter of days.

Due to the high variability of this kind of network, the symptoms of those attacks are not easy to detect and can be lost in the normal noise of the network behavior (traffic peaks and topology changes are quite normal in LLN). Therefore, an intelligent approach is needed that is able to reveal subtle changes in the measured data are typical of a known anomalous behavior Possible Attacks Against IoT Even though the existing literature about attacks against the IoT is relatively reduced, a number of attacks against sensor network technologies apply with a few minor modifications.

Such attacks can be roughly classified into two classes: insider attacks (where the malicious node needs to be authenticated and be in possession of the network encryption keys) and outsider attacks (where the attacker just needs to be within the rad range of the victims).

In particular, a number of attacks against routing performed by a malicious node in the DAG can be imagined.

A node can, for example, perform selective forwarding: while still participating correctly to the routing protocol, it can just discard some of the traffic messages that it is asked to forward. Although this can be revealed by end-to-end mechanisms, due to the low traffic rate and lossiness of the IoT networks detection of the issue can be difficult and slow.

Other attacks include a malicious node impersonating multiple identities or advertising forged routing information, so as to gain a central role in the routing topology.

While attacks belonging to the former class can be prevented through well-designed cryptography and authentication, in the latter case they have to be detected by monitoring the network environment.

The simplest form of attack that can be performed against an RF network is jamming. This consists in artificially creating an interference, so as to prevent message decoding. There are several variations of a jamming attack, with different degrees of complexity and subtlety. The attacker can continuously emit power on the spectrum (continuous jamming), create a collision when it detects activity on the channel (reactive jamming) or attack only a particular type of traffic (selective jamming). The damage from a jamming attack can be maximized if the attacker is able to estimate the centrality of a node in the routing topology (this can be obtained by accounting the amount of traffic transmitted and received by each node, by leveraging the fact that the link layer addresses are in clear). Once the jammer has detected the most central node, it can try to make it unreachable for its descendants, which will in turn be forced to select another parent. This can potentially create continuous route oscillations and convergences.

Other kinds of external denial-of-services attacks can be performed by exploiting the fact that a number of messages in the WPAN do not need authentication: among those are discovery beacons and some of the EAPoL messages for authentication.

In particular, discovery beacons can be used for injecting bogus synchronization information in the network, so as to prevent two nodes from meeting on the right unicast communication frequency.

EAPoL authentication messages, instead, have to be relayed by the WPAN nodes up to the FAR, and from there until the AAA server. This mechanism allows an attacker to generate routable traffic, thus flooding the network and wasting bandwidth and processing power. A mitigation strategy may be for authentication requests can be rate-limited. However this may result in legitimate nodes being prevented from authenticating when an attack is in progress.

Other attacks can be performed against the 802.11i protocol which is used for exchanging key information between the authenticating node and the FAR (and therefore, cannot be protected by link layer encryption). Such attacks are documented in the scientific literature and aim at blocking the handshake between the client and the access point. This can be achieved by an attacker by interleaving a forged message between two messages in the handshake. This implicitly resets the handshake state, so that subsequent messages from the authenticating node are discarded.

Frequency-hopping and synchronization in 802.15.4

In a channel-hopping mesh network, devices communicate using different channels at different times. To communicate a packet, a transmitter-receiver pair must be configured to the same channel during packet transmission. For a transmitter to communicate with a receiver at an arbitrary time in the future, the transmitter and receiver must synchronize to a channel schedule that specifies what channel to communicate on at what time. Channel schedules may be assigned to each transmitter-receiver pair independently so that neighboring transmitter-receiver pairs can communicate simultaneously on different channels. Such a strategy increases aggregate network capacity for unicast communication but is inefficient for broadcast communication. Alternatively, all devices in a network may synchronize with a single channel schedule such that all devices transmit and receive on the same channel at any time. Such a strategy increases efficiency for broadcast communication since a single transmission can reach an arbitrary number of neighbors, but decreases aggregate network capacity for unicast communication since neighboring individual transmitter-receiver pairs cannot communicate simultaneously without interfering. Mesh networks typically utilize both unicast and broadcast communication. Applications use unicast communication to communicate data to a central server (e.g. AMI meter reads) or configure individual devices from a central server (e.g. AMI meter read schedules). Network control protocols use unicast communication to estimate the quality of a link (e.g. RSSI and ETX), request configuration information (e.g. DHCPv6), and propagate routing information (e.g. RPL DAO messages). Applications use multicast communication for configuring entire groups efficiently (e.g. AMI meter configurations based on meter type), firmware download to upgrade (e.g. to upgrade AMI meter software to a newer version), and power outage notification. Network control protocols use multicast communication to discover neighbors (e.g. RPL DIO messages, DHCPv6 advertisements, and IPv6 Neighbor Solicitations) and disseminate routing information (e.g. RPL DIO messages). Existing systems optimize for both unicast and broadcast communication by synchronizing the entire network to the same channel-switching schedule and using a central coordinator to compute and configure channel schedules for each individual device, or else more efficiently optimizing for both unicast and broadcast communication in a channel-hopping network without need for centrally computing schedules for individual nodes.

In order to join the WPAN enabled with frequency hopping (e.g., an 802.15.4 WPAN), a node needs to synchronize on the frequency hopping schedule of its neighbors. Therefore, each node in the WPAN broadcasts its unicast reception schedule via a discovery beacon, which is not encrypted and sent on every frequency: this allows nodes joining the PAN to join. In greater detail, the discovery beacon message is sent a broadcast destination WPAN and includes several information elements, most notably:

The WPAN SSID String

The unicast scheduling information. In one implementation, this is made up of a slot number and an offset value. This allows the receiving node to compute the slot number the sending node is currently is, and thus, by applying a hash function, to know its current receiving frequency. Note that this algorithm does not require the clocks of the two nodes to be synchronized.

The transmission of a discovery beacon is triggered by an associated trickle timer. However, the information about the scheduling of the broadcast slot is not included in such beacon, but only in the synchronous and unicast beacons, which are encrypted with the network key. In particular, the synchronous beacon is triggered by a trickle timer and it is sent on every frequency (just as the discovery beacon). The unicast beacon, on the contrary, is sent upon request by another node by using a standard unicast transmission. In both cases, the beacon includes a broadcast scheduling information element, which has the same format of the unicast scheduling IE (Information Element). As a consequence, an attacker can interfere with its target during its unicast slot, but ignores the broadcast frequency schedule: the broadcast schedule is therefore much better protected against DoS attacks.

Notably, once a DoS attack is detected, it becomes required to activate some form of control loop to mitigate the issue. In its simple form, this may consist in sending an alarm to the user in the form of a network management message or via the NMS. In addition, in many circumstances it is required to activate some close loop control from the edge of the network in order to quickly mitigate/isolate, if not remediate, the issue. Moreover, the open nature of the physical medium and the fact that unicast frequency scheduling of the nodes is broadcasted in clear using the IEEE 802.15.4 link layer make it extremely difficult to make the attacker powerless. Even if routing can be reconfigured in order to isolate the attacked nodes, it is difficult to prevent an attacker from changing its target. In fact, the attacker can leverage the network reaction in order to make routing unstable. The only safe countermeasure may be completely isolating the physical range of the attacker, but this may have a huge impact on the network functionality (in fact, this may even make a portion of the network unreachable).

Control Loop Control Using Broadcast Channel to Communicate with a Node Under Attack The techniques herein provide a mechanism whereby a node or nodes under attack may receive traffic. To that end, a unicast packet (e.g., an attack-mitigation packet) may be encapsulated into a tunnel destined to one or more nodes under attack that may be responsible for locally reaching the destination(s) using the broadcast schedule. In one embodiment, the attack-mitigation packet is sent by a management device (e.g., a NMS, FAR, capable node, etc.) using a unicast link-layer address; in another embodiment, the attack-mitigation packet is sent using a broadcast link layer address and a TTL is used to limit the broadcast scope. The techniques herein are generalized to the case of multi-node attack, allowing for locally transmitting packets from a set of nodes to another set of nodes under attack so as to allow for communication with the node(s) under attack, thus providing an attack mitigation solution. According to the techniques herein, a learning machine uses probabilities of attacks in order to compute a set of nodes under attack and the set of end-point nodes transmitting unicast packets using local broadcast. The proposed solution may be extended to the upstream communication mode, which is potentially limited in time. The techniques then specify a trigger in order to dynamically adapt the unicast/broadcast rat in the event that the overhead of such an attack mitigation approach is too high as in, for example, the case of a massive multi-node attack.

Figure 4:
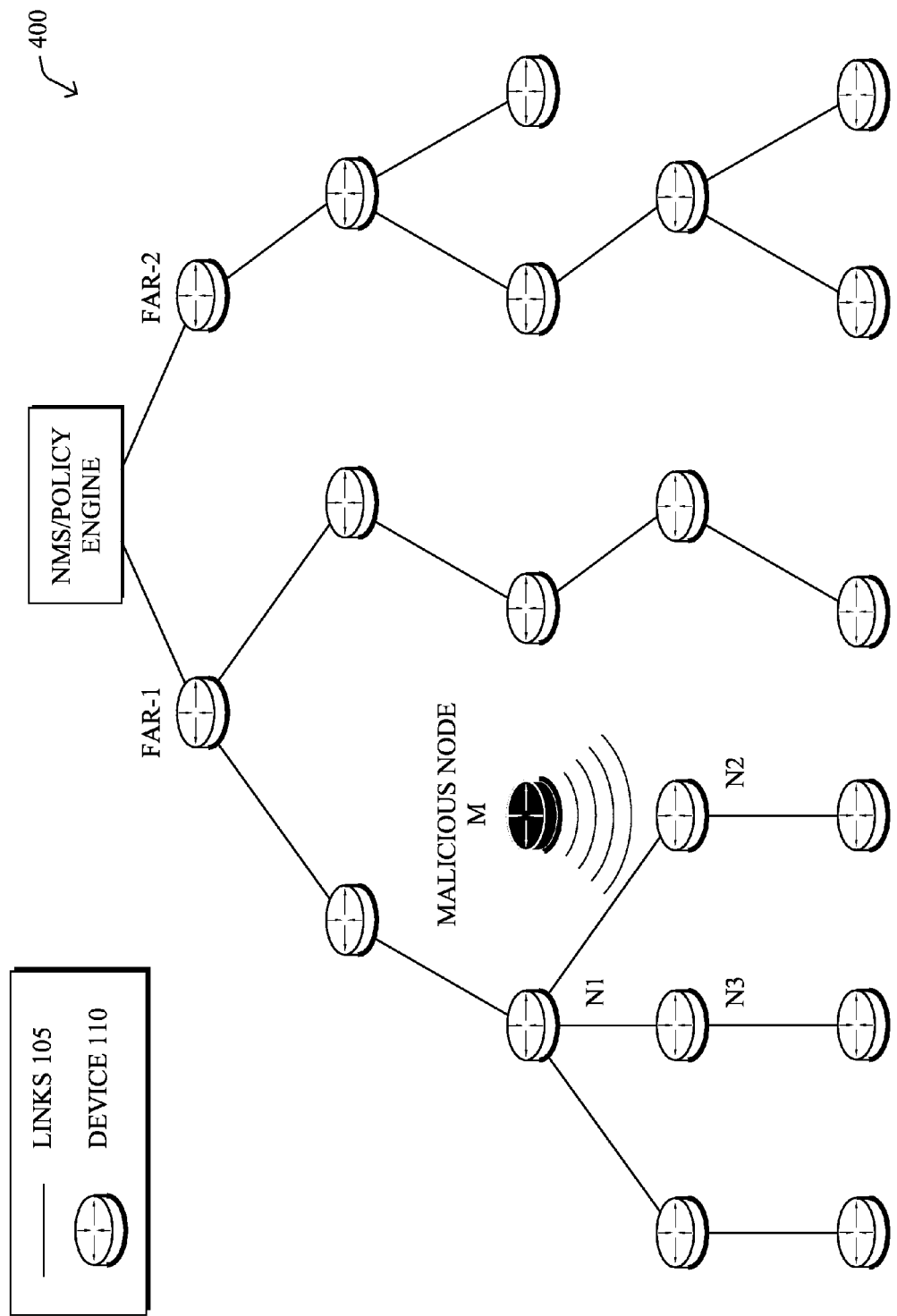
FIGS. 4-5 illustrate an example of a control loop control using broadcast channel to communicate with a node under attack.
Figure 5:
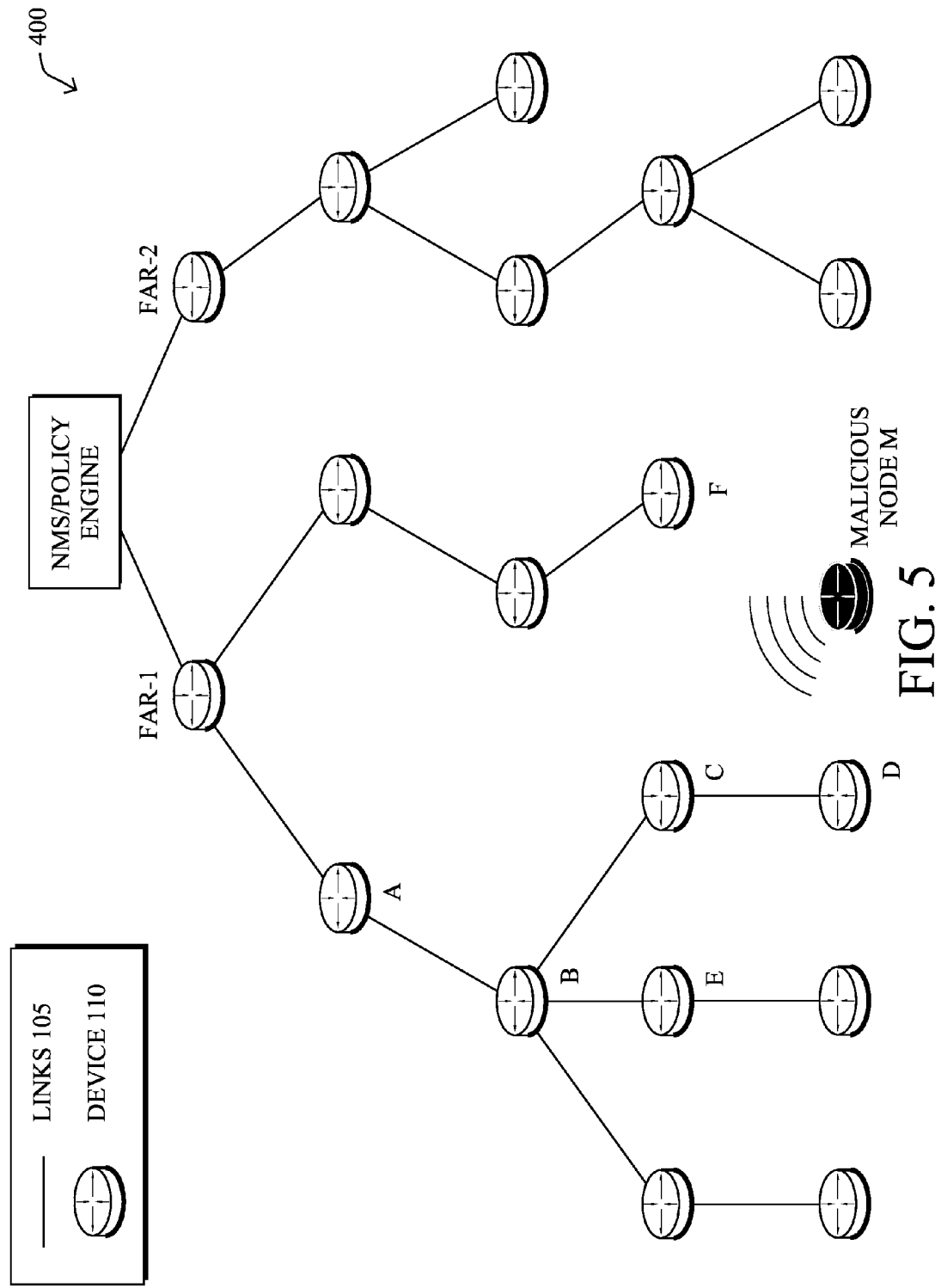

Operationally, as shown in (and with general reference to) FIGS. 4-5, in most IoT networks such as LLN, when a node is under attack (e.g. a malicious node is performing selective/reactive jamming), the consequence of a DoS is that such node can no longer receive any packets. When the DoS is not-so-subtle, and every single packet destined to a node N1 is jammed by the malicious node M, the node N1 stops receiving traffic from nodes N2, N3, etc., thus effectively taking the node down.

Referring to the example shown in FIG. 5 where a node C is being attacked by a jammer M. As already pointed out, node C can no longer receive traffic from its neighbors (worst case) when using unicast packets (or should the attack be selective, a percentage of packets may be dropped). Therefore, communication with C becomes difficult, if not impossible.

According to the techniques herein, a mechanism is specified whereby for a node to communicate with a node under attack, an attack-mitigation packet is first sent to an intermediate node by a management device via a tunnel from where the attack-mitigation packet is sent to the destination using a broadcast message. As explained below, the attack-mitigation packet may be transmitted from a set S of remote nodes to another set of attacked nodes S', should the attack be a multi-node attack.

Consider the case of node C being attacked by a malicious node M. Once the attack has been detected by a local classifier on the node C itself or a stronger classifier hosted by the Field Area Router (FAR), it may be analyzed by an ANN. For example, a list S' of nodes suspected to be under attack is computed by the LM. In the most common case, S' is a singleton (e.g., C is the only node being attacked). The techniques herein provide that a packet P (e.g., an attack-mitigation packet) destined to any node in the list S' may first be encapsulated in another unicast IPv6 packet, which comprises a newly specified IPv6 Destination header that comprises the following information:

A new flag called to E flag (Encapsulated flag) namely a unicast tunnel.
Radius R
Timer T1
Up (Upstream) Flag
(optional) Local caching C flag
(optional) Bloom filter B Such an attack-mitigation packet can be sent to any of the nodes in the physical range of the attacked node, which will then act as proxy node. In the event that it is not possible to find a node that is not in S', and which has one-hop connectivity to the destination node, the Radius parameter may be used to limit the span of the broadcast transmission (described below in greater detail) should the frame be transmitted as with a link-layer broadcast address. Otherwise, the unicast packet is sent by the proxy using the broadcast slot. Upon receiving the packet with the new Destination IPv6 header, the proxy node removes the outer header to retrieve the unicast packet destined to the node under attack and triggers the following set of actions:

In one embodiment, the packet is sent using a unicast link-layer address in the broadcast slot. In another embodiment, the packet is encapsulated within a broadcast link-layer frame, which is advantageous because the broadcast schedule is encrypted, therefore packets sent using a broadcast schedule cannot be jammed by the attacker. To make the broadcast schedule difficult to determine by an attacker, the channel-hopping function may be seeded using a shared secret between the source and destination.

If R=1, this means that, according to the LM prediction, there is one node under attack (|S'|=1), thus the TTL of the packet is set to 1. This can also be the case when the proxy node has one-hop connectivity to the destination address.

If R>1, the LM has determined that the attack was a multi-node attack.

Consequently the list S' of nodes suspected to be under attack comprises more than one element.

If the same packet must be sent to all nodes in S', the packet destination is set to a well-known IP address in the form of a multicast address, an additional header is added that carries out the bloom filter used to identify all destinations, and the TTL of the packet is set to the value of the radius R.

Generally, the set of unicast attack-mitigation packets may be sent using the tunnel to the proxy, at which point the attack-mitigation packet is sent using the broadcast slot. If the packet is sent using a broadcast link-layer frame, the TTL is set to R in order to limit the scope of the broadcast.

For the sake of illustration, if the LM determines that both nodes C and D are under attack with a high probability P, then a unicast tunneled packet destined to C and D is first encapsulated by the FAR (with E=1, R=2, B set to include the address of C and D) and sent to the node B. Upon receiving the unicast packet, B extracts the unicast packet from the tunnel, and sends it to C and D. In another example, if the packet is sent unicast a broadcast link layer address, it sets the TTL to 2, and sends that packet using the broadcast slot. If the same packet is sent to both C and D, the IPv6 address is then set to a well-known multicast address.

In another embodiment, the sending node (e.g. FAR) may also set a newly defined flag called the local caching flag. When set, this requires that the end-point of the tunnel (B in our example) caches the attack-mitigation packets, arms a local timer and retransmits locally the attack-mitigation packet until acknowledged by the node(s) suspected to be under attack (should the layer-2 not be enabled with local acknowledgement).

In yet another embodiment, the LM may send (using the tunneling mechanism described above) the same packet destined to a set of nodes S' to a set of proxy nodes S, should the end-point of the tunnel also be suspected to be under attack with a probability P>P_Min. For example, if the LM determines that the probability of being under attack in a large PAN for the nodes B, C, D and F is 0.4, 0.8, 0.9 and 0.3 respectively, the LM would set S to {B, F} and S' to {C, D}. This may happen when the attack is a multi-node attack, in which case, according to this invention, a unicast packet destined to a set of nodes S may be sent using a set of tunnels to a set S' of nodes. This is a generalization of the mechanism described above whereby the packet is sent using the broadcast schedule from more than one node, using appropriate radius (TTL at layer-3) in order to limit the scope of the broadcast.

Should the attack be a multi-node attack (|S'|>1), a similar mechanism may be used for the reverse (upstream direction). Indeed, if a node N is attacked (unicast schedule) it may no longer receive but it can still transmit packets. That being said, if the attack is multi-node, its best next hop may not be able to receive either (therefore making upstream communication impossible for the target node). In this case, the tunneling approach described above may also be used. For example, if the LM determines that the best parent of a node C is under attack (after inspecting the routing table), then the Up bit is set indicating to the node C to send unicast packet to its parent for the upstream packet using the broadcast slot or also use a tunnel with a given TTL (Radius) for the encapsulated packet in order to communicate in the upstream direction. Should a node have multiple ancestors under attack, their children can still use the same approach for the upstream traffic sending unicast packet in broadcast slots with a Radius >1.

In another embodiment, the mechanism described above may be activated for a given period of time T1. If T1>0, this serves as an indication that the nodes under attack should continue to communicate with the tunnel-broadcast approach for the traffic in the upstream direction for a time T1, then revert back to the usual unicast communication. Indeed, the LM may be able to estimate the scope (e.g., number of nodes under attack, localization, criticality of the traffic sent to nodes presumably under attack, etc.) and duration of the attack (should the LM be aware of the time of the attack or the time required to use a mitigation approach). In this case, a node C receiving the unicast packet encapsulated in a broadcast frame and required to use a tunnel to communicate in the upstream direction may only use such a mechanism for a time T1.

The last component of this invention relates to the triggering of a dynamic adjustment of the broadcast schedule, such as where a mechanism to dynamically adjust the rat between unicast and broadcast schedules is in place. If the LM determines that the number of nodes in S and S' and/or the duration of the attack is too large, then it may send a newly defined network management message to the controller in order to increase the duration of the broadcast slot. Indeed, this may be required to absorb all traffic sent using broadcast, and if the number of nodes under attack is too large it is more optimal to switch to a broadcast schedule based approach until the attack stops.

The techniques described herein, therefore, provide for a control loop control using broadcast channel to communicate with a node under attack. In particular, the techniques herein allow for the communication with a node under attack. Detecting the attack is a must, have but communicating with the node is equally critical.

Figure 6:
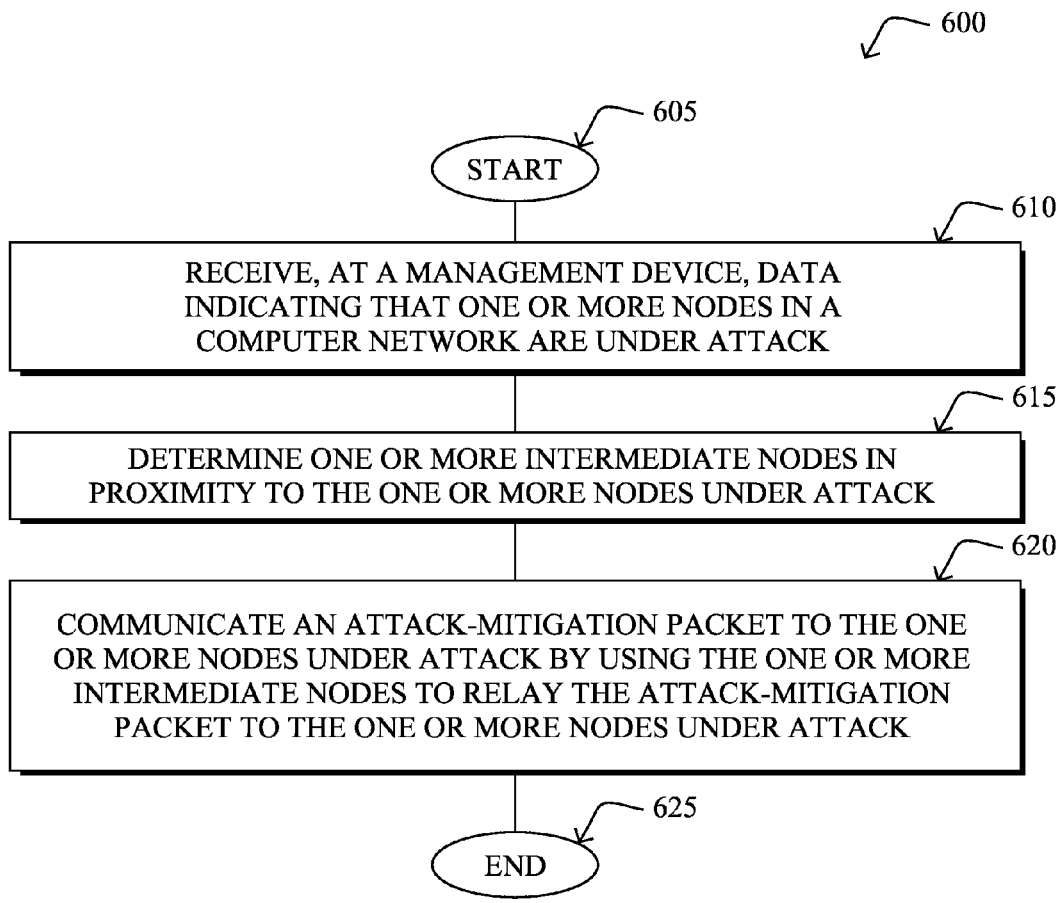
FIG. 6 illustrates an example simplified procedure for control loop control using a broadcast channel may be used to communicate with a node under attack, particularly from the perspective of a management device.

FIG. 6 illustrates an example simplified procedure 600 for control loop control using a broadcast channel may be used to communicate with a node under attack, particularly from the perspective of a management device. The procedure 600 may start at step 605, and continue to step 610 where, as described above, a management device may receive data indicating that one or more nodes in a computer network are under attack. As shown in step 615, the management device may then determine that one or more intermediate nodes are in proximity to the one or more nodes under attack. The management device may then communicate an attack-mitigation packet to the one or more nodes under attack by using the one or more intermediate nodes to relay the attack-mitigation packet to the one or more nodes under attack, as shown in step 620. Illustratively, the simplified procedure may end at step 625.

Figure 7:
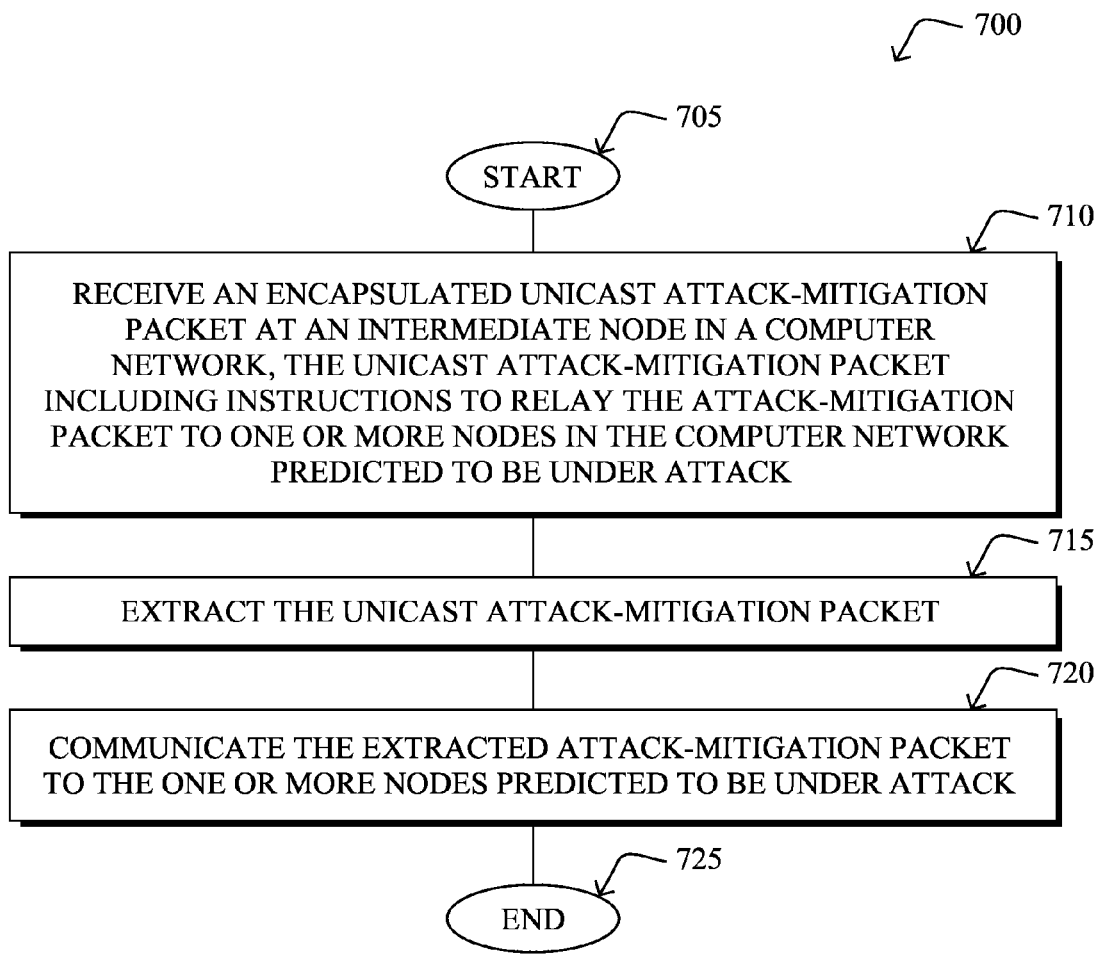
FIG. 7 illustrates an example simplified procedure for dynamic division of a reactive routing network into subdomains, particularly from the perspective of an intermediate node.

Similarly, FIG. 7 illustrates an example simplified procedure 700 for control loop control using a broadcast channel may be used to communicate with a node under attack, particularly from the perspective of an intermediate node. The procedure 600 may start at step 605, and continue to step 610 where, as described above, an intermediate node in a computer network may receive an encapsulated unicast attack-mitigation packet, which may include instructions to relay the attack-mitigation packet to one or more nodes in the computer network predicted to be under attack. As shown in step 615, the intermediate node may then extract the unicast attack-mitigation packet, and then communicate the extracted attack-mitigation packet to the one or more nodes predicted to be under attack. Illustratively, the simplified procedure may end at step 720.

It should be noted that while certain steps within procedures 600 and 700 may be optional as described above, the steps shown in FIGS. 6 and 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for computer network attack mitigation (e.g., control loop control using a broadcast channel may be used to communicate with a node under attack), generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at a management device, data indicating that one or more nodes in a computer network are under attack;
    determining, by the management device, one or more intermediate nodes in proximity to the one or more nodes under attack by using a machine learning model on the data to determine the one or more intermediate nodes in proximity to the one or more nodes under attack;
    communicating with the one or more nodes under attack by sending an attack-mitigation packet from the management device to the one or more nodes under attack using the one or more intermediate nodes act as a proxy to relay the attack-mitigation packet to the one or more nodes under attack,
    wherein communicating includes:
        encapsulating the attack-mitigation packet to the one or more intermediate nodes in a unicast packet, wherein the encapsulated attack-mitigation packet comprises routing information so that it is relayed to the one or more nodes under attack using a broadcast channel; and
    using the machine learning model on the data to predict that the scope, duration, or scope and duration of the attack exceeds a predetermined value; and, in response,
    communicating a network management message to dynamically adjust a broadcast schedule for the network.

2. The method as in claim 1, wherein the attack-mitigation packet is relayed to the one or more nodes under attack using the broadcast channel according to a broadcast slot in a frequency-hopping communication schedule.

3. The method as in claim 1, wherein the encapsulated attack-mitigation packet comprises routing information so that it is relayed using a broadcast link-layer frame.

4. The method as in claim 1, wherein the attack-mitigation packet is locally cached on the one or more intermediate nodes until an acknowledgement is received from the one or more nodes under attack.

5. A method, comprising:
    receiving an encapsulated unicast attack-mitigation packet at an intermediate node in a computer network, the unicast attack-mitigation packet including instructions to relay the attack-mitigation packet to one or more nodes in the computer network predicted to be under attack;
    extracting, by the intermediate node, the encapsulated unicast attack-mitigation packet;
    communicating, by the intermediate node, the extracted attack-mitigation packet to the one or more nodes predicted to be under attack by relaying the extracted attack-mitigation packet using a broadcast channel,
    wherein a machine learning model is used on data to determine that the intermediate node is in proximity to the one or more nodes under attack and to predict that the scope, duration, or scope and duration of the attack exceeds a predetermined value; and
    dynamically adjusting, at the intermediate node, a broadcast schedule for the network in response to receiving a network management message generated when the predetermined value is determined by the learning machine model to be exceeded.

6. A method as in claim 5, wherein communicating further comprises:
    relaying the extracted attack-mitigation packet using a broadcast link-layer frame.

7. A method as in claim 5, wherein communicating further comprises:
    multicasting the extracted attack-mitigation packet when the one or more nodes under attack exceeds a predetermined number of nodes.

8. A method as in claim 6, further comprising:
    setting a time-to-live timer for the extracted attack-mitigation packet corresponding to the number of one or more nodes predicted to be under attack.

9. An apparatus, comprising:
    one or more network interfaces to communicate within a computer network;
    a processor coupled to the network interfaces and configured to execute one or more processes; and
    a memory configured to store a process executable by the processor, the process when executed operable to:
        receive data indicating that one or more nodes in the computer network are under attack;
        use a machine learning model on the data to identify one or more nodes under attack and one or more intermediate nodes in proximity to the one or more nodes under attack;
        communicate with a one or more nodes under attack by sending an attack-mitigation packet to the one or more nodes under attack using the one or more intermediate nodes acting as one or more proxy nodes for communicating traffic to the one or more nodes under attack,
        wherein communicating includes:
            encapsulating the attack-mitigation packet to the one or more intermediate nodes in a unicast packet, wherein the encapsulated attack-mitigation packet comprises routing information so that it is relayed to the one or more nodes under attack using a broadcast channel; and use the machine learning model on the data to predict that the scope, duration, or scope and duration of the attack exceeds a predetermined value; and, in response, communicate a network management message to dynamically adjust a broadcast schedule for the network.

10. The apparatus as in claim 9, wherein the encapsulated attack-mitigation packet comprises routing information so that it is relayed using a broadcast link-layer frame.

11. The apparatus as in claim 9, wherein the duration of the broadcast schedule is increased.

\* \* \* \* \*